(12) United States Patent
Fujioka

(10) Patent No.: US 10,343,460 B2
(45) Date of Patent: Jul. 9, 2019

(54) PNEUMATIC TIRE

(71) Applicant: TOYO TIRE & RUBBER CO., LTD., Osaka-shi, Osaka (JP)

(72) Inventor: Tsuyoshi Fujioka, Osaka (JP)

(73) Assignee: TOYO TIRE CORPORATION, Hyogo (JP)

( * ) Notice: Subject to any disclaimer, the term of this patent is extended or adjusted under 35 U.S.C. 154(b) by 104 days.

(21) Appl. No.: 15/158,857

(22) Filed: May 19, 2016

(65) Prior Publication Data

US 2016/0361952 A1    Dec. 15, 2016

(30) Foreign Application Priority Data

Jun. 15, 2015    (JP) .................................. 2015-120349

(51) Int. Cl.
| | | |
|---|---|---|
| *B60C 11/03* | (2006.01) | |
| *B60C 11/11* | (2006.01) | |
| *B60C 11/13* | (2006.01) | |

(52) U.S. Cl.
CPC ........... *B60C 11/0306* (2013.01); *B60C 11/11* (2013.01); *B60C 2011/039* (2013.01);
(Continued)

(58) Field of Classification Search
CPC . B60C 11/0306; B60C 11/0332; B60C 11/11; B60C 2011/0334; B60C 2011/0341; B60C 2011/0346; B60C 2011/0348; B60C 2011/0367; B60C 2011/0372; B60C 2011/0383; B60C 2011/039; B60C 2011/1361; B60C 11/12; B60C 11/03; B60C 11/1281
USPC ....................................... 152/209.25, 209.18
See application file for complete search history.

(56) References Cited

U.S. PATENT DOCUMENTS

2011/0232815 A1*  9/2011  Nakamizo ........... B60C 11/0306
                                             152/209.18
2015/0165828 A1*  6/2015  Kaji ..................... B60C 11/1281
                                             152/209.18
(Continued)

FOREIGN PATENT DOCUMENTS

JP        3-273905 A     12/1991
JP        07242107 A  *  9/1995  ......... B60C 11/1281
(Continued)

OTHER PUBLICATIONS

JPH07242107A_MT (Year: 1995).*
(Continued)

*Primary Examiner* — Matthew J Daniels
*Assistant Examiner* — Yunju Kim
(74) *Attorney, Agent, or Firm* — Westerman, Hattori, Daniels & Adrian, LLP

(57) ABSTRACT

A pneumatic tire includes a plurality of first shoulder blocks arranged in a tire circumference direction on a main groove side in a shoulder land portion, and a plurality of second shoulder blocks arranged in the tire circumference direction on a tire ground contact end side in the shoulder land portion, in which the first shoulder blocks and the second shoulder blocks are arranged alternately in the tire circumference direction, the first shoulder blocks each include a protruding portion protruding into: a space between two of the second shoulder blocks arranged in the tire circumference direction, at least at the time of being grounded, the protruding portion overlaps in the tire circumference direction with the second shoulder blocks on both sides in the tire circumference direction.

6 Claims, 3 Drawing Sheets

(52) U.S. Cl.
CPC .......... *B60C 2011/0346* (2013.01); *B60C 2011/0348* (2013.01); *B60C 2011/0367* (2013.01); *B60C 2011/0372* (2013.01); *B60C 2011/0383* (2013.01); *B60C 2011/1361* (2013.01)

(56) References Cited

U.S. PATENT DOCUMENTS

2015/0352903 A1* 12/2015 Ookawa .............. B60C 11/0306
   152/209.18
2016/0243898 A1    8/2016 Ito

FOREIGN PATENT DOCUMENTS

| JP | 4149219 B2 | 9/2008 |
| JP | 4330561 B2 | 9/2009 |
| JP | 5160243 B2 | 3/2013 |
| WO | 2015/056573 A1 | 4/2015 |

OTHER PUBLICATIONS

Office Action dated May 31, 2017, issued in counterpart Chinese Application No. 201610211419.0, with partial English machine translation. (4 pages).
Office Action dated Jan. 8, 2019, issued in counterpart Japanese Application No. 2015-120349, with English translation. (4 pages).

\* cited by examiner

PNEUMATIC TIRE

CROSS REFERENCE OF RELATED application

This application is based upon and claims the benefit of priority of the prior Japanese Patent Application No. 2015-120345 (applied Jun. 15, 2015), the entire contents of which axe incorporated herein by reference.

BACKGROUND OF THE INVENTION

1. Field of the Invention
The present invention relates to a pneumatic tire,
2. Related Art
A plurality of main grooves extending in a tire circumference direction segmentalize a tread to form a center land, portion inside in a tire: width direction and shoulder land portions outside in the tire width direction. Depending on the tires, a shoulder land portion is formed into a rib continuing in the tire circumference direction. However, as described in Japanese Patent No. 4149219 and Japanese Patent No. 4330561, there is a fire in which the shoulder land portion is segmentalized by a plurality of lateral grooves extending in the tire width direction to form a block row. As illustrated in Japanese Patent No. 5160243, there is also a tire in which the shoulder land portions are segmentalized by the lateral grooves arranged alternately on the main groove side and the tire ground contact end side and narrow grooves extending in the tire circumference direction to form the block row in a zigzag pattern.

The tire having the block row includes the lateral grooves, and thus tends to have excellent traction properties. If the lateral grooves are deep, the lateral grooves remain being deep even though wear of the tread has become advanced, and the traction properties are ensured.

Since the shoulder land portions are subjected to a significant lateral force from the tire ground contact end sides, wear and uneven wear ar:e likely to become advanced. Therefore, it is important to ensure wear-resistance properties and uneven-wear-resistance properties of the shoulder land portions. However, since blocks are low rigidity and thus are more likely to move compared with a rib continuing in the tire circumference directions, and the shoulder land portions having the block row may be poor in wear-resistance properties and uneven-wear-resistance properties in some cases. In particular, in the case where the lateral grooves are deep, the wear-resistance properties and the uneven-wear-resistance properties are more likely to become poor. In this manner, in the related art, nevertheless wear-resistance properties and uneven-wear-resistance properties are important for the shoulder land portions, the wear-resistance properties and the uneven-wear-resistance properties cannot be secured easily when traction properties are ensured.

SUMMARY

Accordingly, it is an object of the invention to provide a pneumatic tire having excellent traction properties and, in addition, having excellent wear-resistance properties and uneven-wear-resistance properties.

A pneumatic tire of an embodiment is a pneumatic tire including a shoulder land portion between a main groove extending in a tire circumference direction and a tire around contact end including: a plurality of first shoulder blocks arranged in the tire circumference direction on the main groove side in the shoulder land portion, and a plurality of second shoulder blocks arranged in the tire circumference direction on the tire ground contact end side in the shoulder land portion, in which the first shoulder blocks and the second shoulder blocks are arranged alternately in the tire circumference direction, the first shoulder blocks each include a protruding portion protruding into a space between two of the second shoulder blocks arranged in the tire circumference direction, at least at the time of being grounded, the protruding portion of each of the first shoulder blocks overlaps in the tire circumference direction with the second shoulder blocks on both sides in the tire circumference direction and the first shoulder block overlaps in the tire width direction with the second shoulder blocks on both sides in the tire circumference direction.

The pneumatic tire of the embodiment has excellent traction properties and has excellent wear-resistance properties and uneven-wear-resistance properties.

DETAIL DESCRIPTION OF INVENTION

A pneumatic tire 10 of an embodiment is provided with bead portions on both sides in a tire width direction, and carcasses are folded back from inside to outside in the tire width direction to envelope the bead portions and forming a framework of the pneumatic tire 10. The carcass is provided with a belt layer and a belt reinforcing layer outside in the tire radius direction, and a tread 20 is provided outside in a tire radius direction. Side walls are provided on both sides of the carcass in the tire width direction. In addition to these members, a plurality of members depending on requirements in terms of functions of the tire are also provided.

Figure 1:
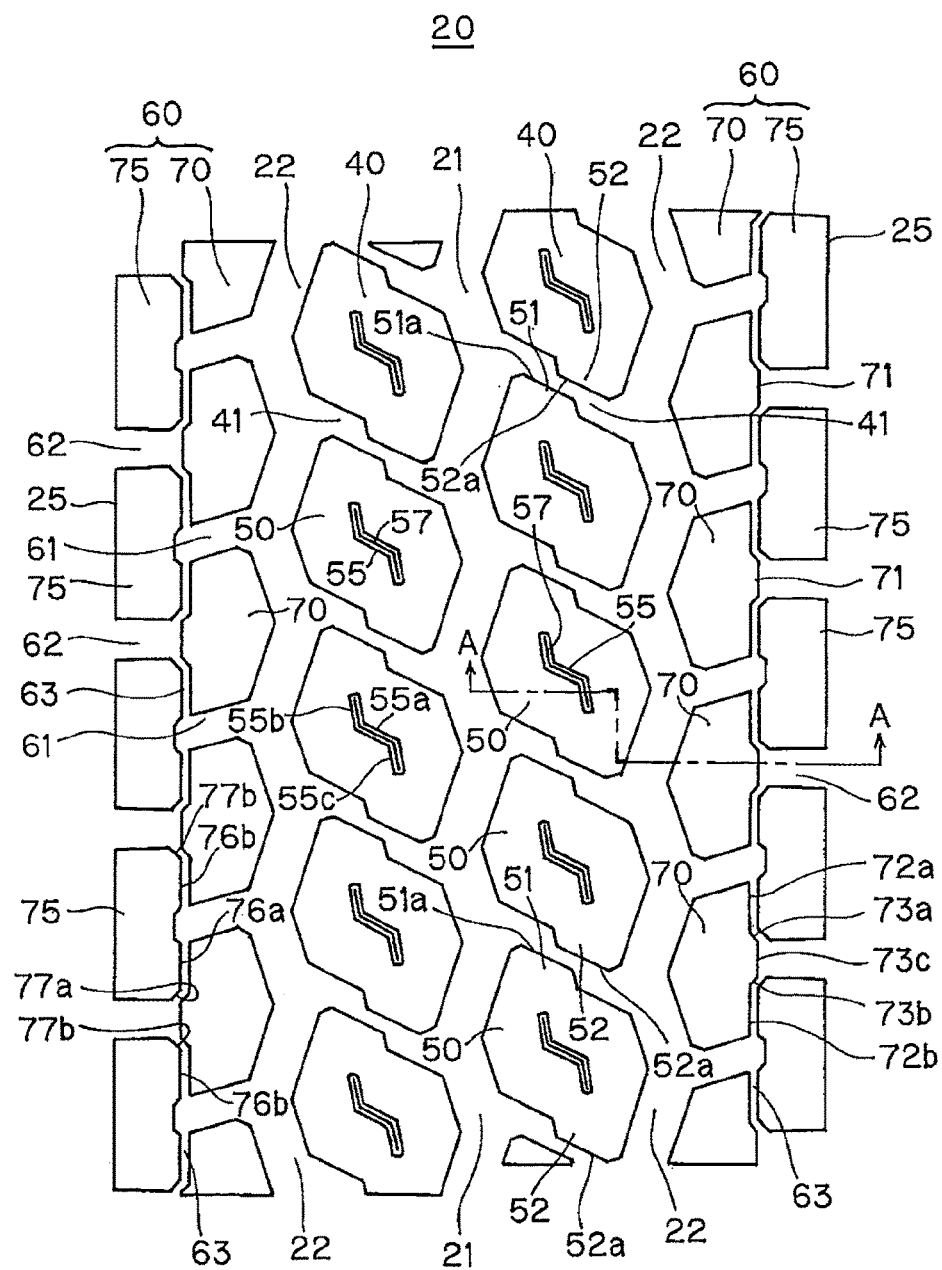
FIG. 1 is a drawing illustrating a tread pattern of a pneumatic fire ox an embodiment.
Figure 2:
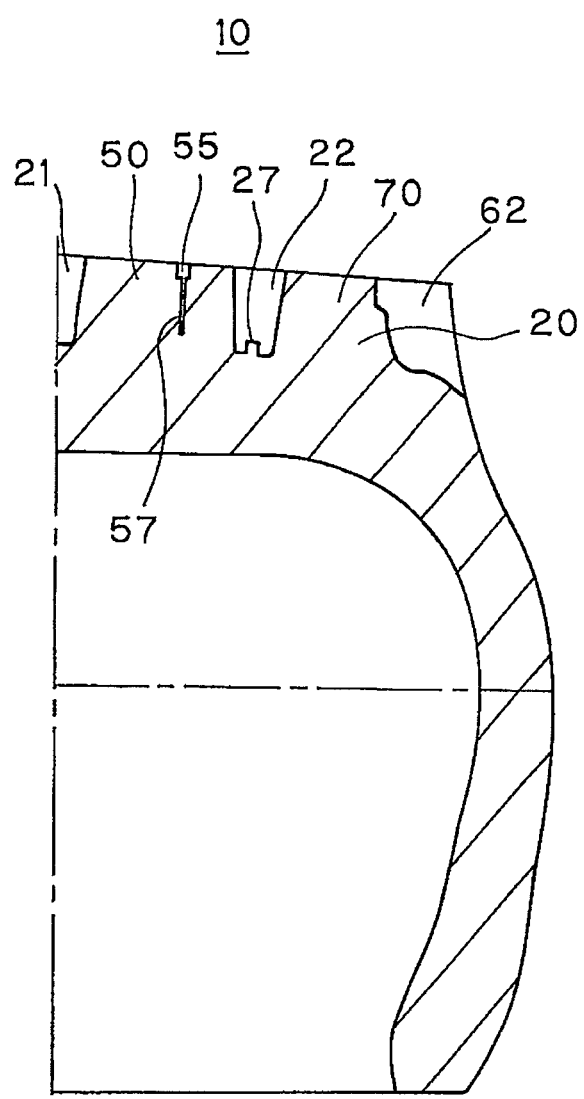
FIG. 2 is a cross-sectionai view taken along line A-A in FIG. 1.

As illustrated in FIG. 1, the tread 20 of the embodiment is provided with three main grooves extending in a tire circumference direction. One of the three main grooves is a main groove 21 provided along a tire equator, and remaining two main grooves are main grooves 22 and 22 provided on both sides in the fire width direction. These main grooves 21, 22 and 22 have a zigzag pattern, and extend in the tire circumference direction. Angular portions of the zigzag patterns of the main grooves 21, 22 and 22 are shifted from each other in the tire circumference direction. A land portion of the tread 20 is segmentaiized into a center portion in the tire width direction interposed between the main grooves 22 and 22 on both sides in the tire width direction and shoulder land portions 60 and 60 interposed between the main grooves 22 and the tire ground contact ends 25 on both sides in the tire width direction. The center portion in the tire width direction is segmentaiised by the main groove 21 extending along the tire equator into two center land portions 40 and 40 arranged in the tire width direction. As illustrated in FIG. 2, a small projection 27 configured to prevent stone catching is preferably provided on the groove bottom of each of the main grooves 22. A projecting height of the small projection 27 from the groove bottom is lower than the depth of the main grooves 22. Preferably, a plurality of the small projections 27 are provided and arranged in the direction of extension of the main grooves 22. Preferably, the small projections 27 are provided also in the main groove 21 extending along the tire equator.

By the tire ground contact ends 25 is meant ground contact ends in the tire width direction in a state in which the pneumatic tire 10 is assembled to a proper rifts, is set to a proper inner pressure, and is applied with a proper load. By the proper rim is meant a standard rim specified by standards such as JATMA, TRA, ETRTO, and the like. By the proper load is meant a maximum load determined by the standard. By the proper inner pressure is meant an inner pressure corresponding to the maximum load.

As illustrated in FIG. 1, the shoulder land portions 60 each include first shoulder lateral grooves 51 and second shoulder lateral grooves 62. The first shoulder lateral grooves 61 extend at a slope with respect to the tire width direction, and ends thereof located inside in the tire width direction open toward angular portions of the zigzag pattern of the main grooves 22, and ends located outside in the tire width direction are closed in the shoulder land portions 60. The second shoulder lateral grooves 62 extend in the tire width direction, and ends located inside in the tire width direction are closed in the shoulder land portions 60, and ends located outside in the tire width direction reach the tire ground contact end 25. The first shoulder lateral grooves 61 and the second shmilder lateral grooves 62 are arranged equidlstantly in the tire circumference direction. The first shoulder lateral grooves 61 and the second shoulder lateral grooves 62 are arranged alternately in the tire circumference direction. Preferably, the depths of the first shoulder lateral grooves 61 and the second shoulder lateral grooves 62 are not smaller than 70% of the depth of the main grooves 21 and 22. Each of the shoulder land portions 60 is further provided with a shoulder narrow groove 63 extending in the tire circumference direction. The shoulder narrow groove 63 has a constant width in a range where blocks exist on both sides thereof. Preferably, a depth of the shoulder narrow groove 63 fails within a range from 20% to 40% of the depth of the main grooves 21 and 22. The shoulder narrow groove 63 opens at positions in the vicinity of ends of the first shoulder lateral grooves 61 within the shoulder land portion 60 and also opens at positions in the vicinity of ends of the second shoulder lateral grooves 62 within the shoulder land portion 60. The shoulder narrow groove 63 extends in the tire circumference direction while being bent at some points in order to achieve the opening state as described above.

The main groove 22, the shoulder narrow groove 63 and two of the first shoulder lateral grooves 61 and 61 arranged in the tire circumference direction form a first shoulder block 70. The shoulder narrow groove 63, the tire ground contact end 25, and two of the second shoulder lateral grooves 62 and 62 arranged in the tire circumference direction form a second shoulder block 75. A plurality of the first shoulder blocks 70 having the same shape and a plurality of the second shoulder blocks 75 having the same shape are arranged equidistantly in the tire circumference direction to form block rows, respectively. The first shoulder blocks 70 and the second shoulder blocks 75 are arranged alternately in the tire circumference direction. The first shoulder blocks 70 and the second shoulder blocks 75 overlap with each other in the tire width direction.

The first shoulder blocks 70 each include a protruding portion 71 protruding toward the second shoulder block 75 near a center thereof in the tire circumferenee direction. The protruding portion 71 protrudes toward a space between two of the second shoulder blocks 75 and 75 arranged in the tire circumference direction. On both sides of the protruding portion 71 In the tire circumference direction, ends of the first shoulder block 70 located outside in the tire circumference direction are linear first opposing portions 72a and 72b extending in the tire circumference direction. The first opposing portions 72a and 72b oppose the second shoulder blocks 75. The protruding portion 71 includes first slopes 73a and 73b continuing from the first opposing portions 72a and 72b and extending at a slope with respect to the tire circumference direction. The first slopes 73a and 73b of the protruding portion 71 are formed by the above-described bent portions of the shoulder narrow groove 63. A top area 73c of the protruding portion 71 is formed by an end of the second shoulder lateral groove 62 located inside in the tire width direction.

The second shoulder block 75 includes second opposing portions 76a and 76b opposing the first opposing portions 72a and 72b of the first shoulder blocks 70 with the shoulder narrow groove 63 interposed therebetween. The second opposing portions 76a and 76b extend linearly in the tire circumference direction. The second shoulder blocks 75 each include second slopes 77a and 77b opposing the first slopes 73a and 73b with the shoulder narrow groove 63 interposed therebetween. The second slopes 77a and 77b extend at a slope with respect to the tire circumference direction. An angle of slopes of the first slopes 73a and 73b and the second slopes 77a and 77b with respect to the tire circumference direction is the same.

Characteristics of the shapes of the first shoulder block 70 and the second shoulder block 75 as described above are common to both sides in the tire width direction.

The protruding portion 71 of the first shoulder block 70 overlaps in the tire circumference direction with the second shoulder blocks 75 and 75 on both sides thereof in the tire circumference direction at least at the time of being grounded. In other words, in a state in which the pneumatic tire 10 is not grounded, the protruding portion 71 may overlap with the second shoulder blocks 75 and 75 in the tire circumference direction. The protruding portion 71 does not have to overlap with the second shoulder blocks 75 and 75 in the tire circumference direction in the state in which the pneumatic tire 10 is not grounded as long as the protruding portion 71 overlaps with the second shoulder blocks 75 and 75 in the tire circumference direction in a state in which the pneumatic tire 10 is grounded. Here, it is assumed that the pneumatic tire 10 is assembled to a proper rim, is set to a proper inner pressure, and is applied by a proper load at the time of being grounded. The proper rim, the proper inner pressure, and the proper load are defined above.

In this structure, when a force in the tire circumference direction is applied to the shoulder land portions 60 at the time of being grounded, parts of the shoulder narrow grooves 63 where the first slopes 73a and 73b of the protruding portions 71 of the first shoulder blocks 70 and the second slopes 77a and 77b of the second shoulder blocks 75 oppose each other are closed. In other words, the protruding portions 71 of the first shoulder blocks 70 each engage the second shoulder blocks 75 and 75 on both sides thereof in the tire circonference direction.

Accordingly, the protruding portion 71 of the first shoulder block 70 and the second shoulder blocks 75 and 75 support each other in the tire circumference direction.

When a force in the tire width direction is applied to the shoulder land portions 60, parts of the shoulder narrow grooves 63 where the first opposing portions 72a and 72b of the first shoulder blocks 70 and the second opposing portions 76a and 76b of the second shoulder blocks 75 oppose each other are closed, and furthermore, parts where the first slopes 73a and 73b of the protruding portions 71 of the first shoulder blocks 70 and the second slopes 77a and 77b of the second shoulder blocks 75 oppose each other are also closed. In other words, the first shoulder blocks 70 each engage the second shoulder bloods 75 and 75 on both sides thereof in the tire circumference direction. Accordingly, the first shoulder block 70 and the second shoulder blocks 75 and 75 support each other in the tire width direction.

The center land portions 40 are segmentalized by a plurality of center lateral grooves 41 extending in the tire width direction (when the term "tire width direction" is used for expressing a direction in which the grooves extend, the term includes not only a direction parallel to the tire width direction, but also directions at a slope with respect to the tire width direction). The center lateral grooves 41 axe arranged equidistantly in the tire circumference direction. The center lateral grooves 41 connect angular portions of the zigzag patterns of the main grooves 21 and 22 on both sides of the center land portions 40 and extend at a slope with respect to the tire width direction. A depth of the center lateral grooves 41 is preferably not smaller than 70% of the depth of the main grooves 21 and 22.

Two of the center lateral grooves 41 and 41 and two of the main grooves 21 and 22 arranged in the tire circumference direction constitute a center block 50. A plurality of the center blocks 50 having the same shape are arranged equidistantly in the tire circumference direction, and form a block row.

Each of the center blocks 50 includes a first protruding portion 51 protruding from a portion on one side (left side in FIG. 1) in the tire width direction to one side (upper side in FIG. 1) in the tire circumference direction and a second protruding portion 52 protruding from a portion on the other side (right side in FIG. 1) in the tire width direction to the other side (lower side in FIG. 1) in the tire circumference direction, and has a substantially S-shape as a whole. The first protruding portion 51 and the second protruding portion 52 project inward of the center lateral grooves 41 and reduce the width of the center lateral grooves 41. By the width of a groove is meant a length of the groove in a direction orthogonal to a direction of extension of the groove. The center blocks 50 and 50 adjacent to each other in the tire circumference direction are arranged in such a manner that the second protruding portion 52 of the center block 50 on the one side and the first protruding portion 51 of the center block 50 on the other side overlap with each other in the tire circumference direction. Therefore, the center lateral grooves 41 are escn narrowed in width at a portion where the second protruding portion 52 of the center block 50 on the one side and the first protruding portion 51 of the center block 50 on the other side overlap with each other in the tire circumference direction compared with other portions. In the embodiment, a top area (an end in a direction of the width of the center lateral groove 41) 51a of the first protruding portion 51 and a top area (the same as above) 52a of the second protruding portion 52 extend in a linear fashion at a slope with respect to the tire width direction, and extend in parallel to each other with the center lateral groove 41 interposed therebetween.

With the structure described above, when a force in the tire circumference direction is applied to the center land portions 40, the top areas 52a of the second protruding portions 52 of the center blocks 50 on the one side in the tire circumference direction and the top areas 51a of the first protruding portions 51 of the center blocks 50 on the other side in the tire circumference direction come into contact with each other, and the center lateral grooves 41 are closed at the corresponding contact portions. Accordingly, the center blocks 50 and 50 arranged in the tire circumference direction suppert each other.

As illustrated in FIG. 1 and FIG. 2, the center blocks 50 each include a center narrow groove 55 closed at both ends thereof formed therein. The center narrow groove 55 includes a first narrow groove 55a at a center of the center block 50, a second narrow groove 55b extending from an end of the first narrow groove 55a on one side (upper side in FIG. 1) and a third narrow groove 55c extending from an end of the first narrow groove 55a on the other side (lower side in FIG. 1). The second narrow groove 55b and the third narrow groove 55c extend in opposite directions from both ends of the first narrow groove 55a. Accordingly, the center narrow groove 55 has a substantially S-shape which follows the shape of the center block 50 as a whole. The first narrow groove 55a, the second narrow groove 55b, and the third narrow groove 55c extend at a slope with respect to the tire width direction and the tire circumference direction. The center narrow groove 55 preferably overlaps with both of the first protruding portion 51 and the second protruding portion 52 in the tire circumference direction. The center narrow groove 55 includes a sipe 57 formed on the groove bottom thereof. The sipe 57 has the same shape as the center narrow groove 55 when viewed from outside in the tire radius direction, and has a width smaller than that of the center narrow groove 55. A depth of the center narrow groove 55 preferably falls within a range from 5% to 20% of a depth of the main grooves 21 and 22. In addition, a depth of the sipe 57 preferably falls within a range from 40% to 90% of a depth obtained by subtracting the depth of the center narrow groove 55 from the depth of the main grooves 21 and 22.

The center blocks 50, the first shoulder blocks 70, and the second shoulder block 75 of the respective block rows are shifted from each other in the tire circumference direction, but are arranged at regular pitches. A total sum of ground contact surface areas of the center land portions 40 and a total sum of ground contact surface areas of the shoulder land portions 60 are substantially equivalent, and the difference therebetween is preferably within 5%.

The pneumatic tire 10 having the structure as described above is provided with the first shoulder lateral grooves 61 and the second shoulder lateral grooves 62 formed in the shoulder land portion 60 to form the block rows, and thus has excellent traction properties. In particular, in the case where the depths of the first shoulder lateral grooves 61 and the second shoulder lateral grooves 62 have depths not smaller than 70% of the depth of the main grooves 21 and 22, these lateral grooves remain being deep even though wear of the tread 20 has become advanced, and thus the traction properties are ensured.

The protruding portion 71 of the first shoulder block 70 overlaps in the tire circumference direction with the second shoulder blocks 75 on both sides thereof in the tire circumference direction at least at the time of being grounded. Therefore, as described above, when a force in the tire circumference direction is applied to the shoulder land portions 60 at the time of being grounded, the protruding portions 71 of the first shoulder blocks 70 each come into contact with the second shoulder blocks 75 and 75 on both sides thereof in the tire circumference direction, so that the first shoulder blocks 70 and the second shoulder blocks 75 and 75 support each other in the tire circumferential direction. Therefore, even though a force in the tire circumference direction is applied to the shoulder land portion 60, the first shoulder block 70 and the second shoulder blocks 75 do not deform significantly and thus wear and uneven wear are reduced.

As described above, the pneumatic tire 10 has excellent traction properties and, in addition, has excellent wear-resistance properties and uneven-wear-resistance properties.

Since the shoulder land portion 60 is provided with a shoulder narrow groove 63 extending in the tire circumference direction, the pneumatic tire 10 has also excellent side-skid-resistance properties.

The first shoulder block 70 overlaps in the tire width direction with the second shoulder blocks 75 on both sides in the tire circumference direction. Therefore, as described above, when a force in the tire width direction is applied to the shoulder land portions 60, the first opposing portions 72*a* and 72*b* of the first shoulder block 70 and the second opposing portions 76*a* and 76*b* of the second shoulder block 75 come into contact with each other, so that the first shoulder blocks 70 and the second shoulder blocks 75 support each other in the tire width direction. Therefore, even though a force in the tire width direction is applied to the shoulder land portion 60, the first shoulder blocks 70 and the second shoulder blocks 75 do not deform significantly and thus wear and uneven wear are reduced.

The protruding portion 71 includes the first slopes 73*a* and 73*b* extending at a slope with respect to the tire circumference direction, and the second shoulder block 75 includes the second slopes 77*a* and 77*b* opposing the first slopes 73*a* and 73*b*. Therefore, even though any of a force in the tire circumference direction and a force in the tire width direction is applied to the shoulder land portions 60, at least the first slopes 73*a* and 73*b* and the second slopes 77*a* and 77*b* come into contact with each other, so that the first shoulder blocks 70 and the second shoulder blocks 75 support each other.

In the embodiment described above, since the center land portions 40 are each provided with the center lateral grooves 41, excellent traction properties are achieved. In particular, in the case where the center lateral grooves 41 have a depth not smaller than 70% of the depth of the main grooves 21 and 22, the center lateral grooves 41 remain being deep even though wear of the tread 20 has become advanced, and thus the traction properties are ensured. The center blocks 50 each include the first protruding portion 51 protruding in the one side in the tire circumference direction and the second protruding portion 52 protruding on the other side in the tire circumference direction, so that the second protruding portion 52 of the center block 50 on one side and the first protruding portion 51 of the center block 50 on the other side overlap with each other in the tire circumference direction between the blocks adjacent to each other in the tire circumference direction. Therefore, as described above, when a force in the tire circumference direction is applied to the center land portions 40, the second protruding portion 52 and the first protruding portion 51 opposing each other come into contact with each other, and thus the center blocks 50 and 50 arranged in the tire circumference direction support each other. Therefore, the center blocks 50 and 50 do not deform significantly and thus wear and uneven wear are reduced. Since the center land portions 40 have such an effect in addition to the above-described effects of the shoulder land portions 60, the pneumatic tire 10 has specifically excellent traction properties, wear-resistance properties, and uneven-wear-resistance properties.

In addition, since the first protruding portion 51 protrudes from the center block 50 on the one side in the tire width direction and the second protruding portion 52 protrudes from the center block 50 on the other side in the tire width direction, so that the center blocks 50 have uniform rigidity in the tire width direction. Therefore, uneven wear is reduced.

The center blocks 50 are each provided with the center narrow groove 55 closed, at both ends thereof and the sipe 57 is formed at the groove bottom of the center narrow groove 55. Therefore, in the initial state of wear, the center narrow groove 55 contributes to ensure traction properties and side skid resistanoe properties, and from a mid-stage of wear onward in which the wear has become advanced, the sipe 57 contributes to ensure traction properties and side-skid-resistance properties. Here, the center narrow groove 55 does not extend to a deep position, but the center narrow groove 55 extends to a certain depth position and then the sipe 57 having a narrower width continues to a deeper portion. Therefore, rigidity of the entire portion of the center block 50 is ensured and thus wear-resistance properties are ensured.

Here, if the depth of the center narrow grooves 55 is not smaller than 5% of the depth of the main grooves 21 and 22, excellent traction properties and side-skid-resistance properties are achieved specifically in the initial stage of wear. In addition, if the depth of the center narrow grooves 55 is not larger than 20% of the depth of the main grooves 21 and 22, movement of the center blocks 50 is reduced and thus wear and uneven wear are reduced. Here, if the depth of the sipes 57 is not smaller than 40% of the depth obtained by subtracting the depth of the center narrow groove 55 from the depth of the main grooves 21 and 22, excellent traction properties and side-skid-resistance properties are achieved especially from the mid stage of wear onward in which the wear has become advanced. Furthermore, if the depth of the sipes 57 is not larger than 90% of the depth obtained by subtracting the depth of the center narrow grooves 55 from the depth of the main grooves 21 and 22, movement of the center blocks 50 is reduced and thus wear and uneven wear are reduced.

In the case where the center blocks 50 each include the center narrow groove 55 overlapping with the first protruding portion 51 and the second protruding portion 52 in the tire circumference direction, since the center narrow groove 55 is closed when a force is applied from the first protruding portion 51 and the second protruding portion 52 to the center block 50 in the tire circumference direction, movement of the entire center block 50 is reduced and thus wear and uneven wear are reduced.

If the difference between the total sum of the around contact surface areas of the center land portions 48 and the total sum of the ground contact surface areas of the shoulder land portions 60 is within 5%, rigidities of the center land portions 40 and the shoulder land portions 60 are well balanced, and in addition, uneven wear is reduced.

The embodiment described thus far may be modified, replaced, and omitted variously without departing from the gist of the invention.

For example, the number of the main grooves is not limited to three as long as a plurality of the main grooves are provided. The shape of the main grooves is not limited to the zigzag pattern as those in the embodiment described above, and may be a straight pattern or a wavy pattern. The presence or absence of the slope of the lateral groove with respect to the tire width direction is not limited. The shape of the shoulder narrow grooves may be modified without departing from the scope of the invention. Therefore, various modifications are conceivable in the shape of the shoulder block surrounded by the main groove, the lateral grooves, and the shoulder narrow groove. For example, the shape of the protruding portion of the first shoulder block is not limited to the shape in the embodiment described above. The ends of the first shoulder block and the second shoulder block opposing each other in the tire width direction do not have to extend linearly as the first opposing portions 72a and 72b and the second opposing portions 76a and 76b of the embodiment described above, and may have, for example, the zigzag pattern or a wavy pattern.

The shape of the blocks of the center land portions is not limited to those in the embodiment described above. The center land portions may include a rib continuing in the tire circumference direction instead of the blocks formed by the main grooves and the lateral grooves.

Figure 3:
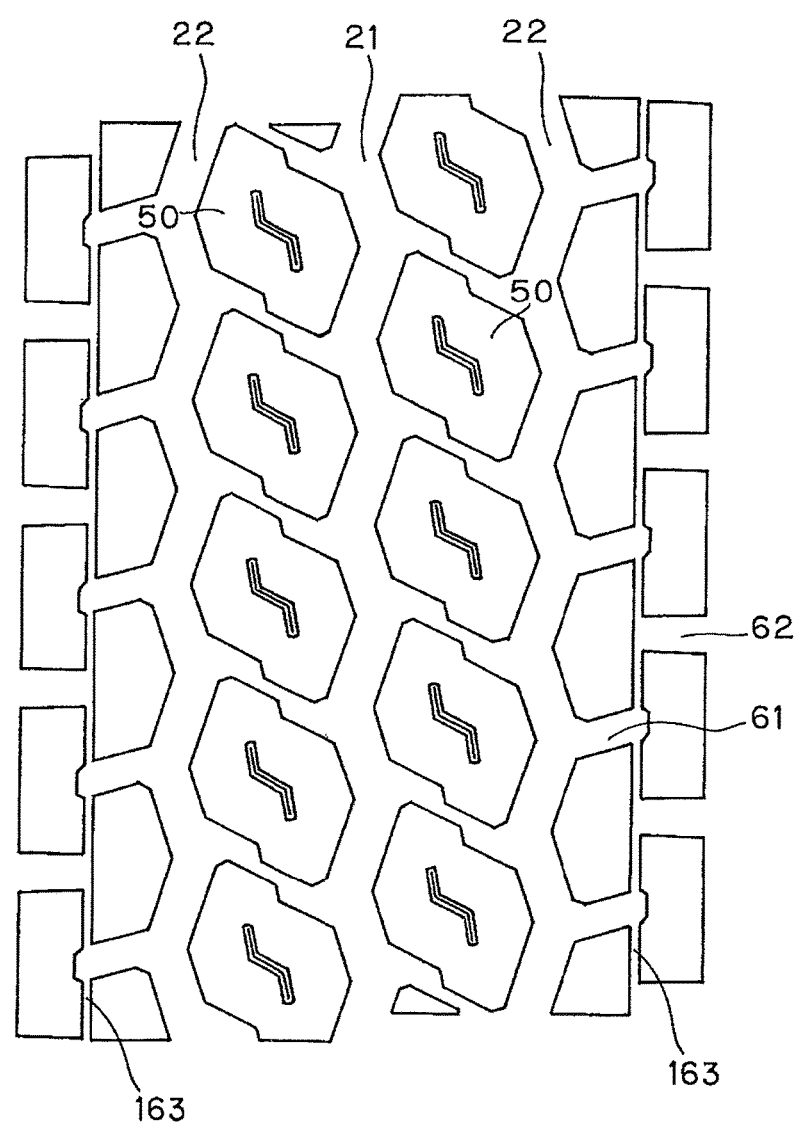
FIG. 3 is a tread pattern of a pneumatic tire of Comparative Example.

Evaluation on wear-resistance properties, uneven-wear-resistance properties, and traction properties of tires in Example and Comparative Example was conducted. A tread of the tire of Example corresponds to the tread of the embodiment described above. A tread of the tires of Comparative Example is illustrated in FIG. 3, which is different from that of Example in that shoulder narrow grooves 163 extend linearly with no bend. The widths and the depths of the main grooves of the tires are shown in Table 1. The dimensions shown in Table 1 are common to Comparative Example and Example. All of the tires have a size of 11R22.5. The tires described above were mounted on a rim having a size of 22.5×7.50, were set to an internal pressure of 700 kPa, and were mounted on a vehicle having a load capacity of 10 t.

TABLE 1

|  | Width | Depth |
|---|---|---|
| main groove | 16.7 mm | 23.6 mm |
| center lateral groove (portion where a first protruding portion and a second protruding portion do not overlap with each other in a tire circumference direction) | 9.7 mm | 18.9 mm |
| center lateral groove (portion where a first protruding portion and a second protruding portion overlap with each other in a tire circumference direction) | 5.5 mm | 18.9 mm |
| center narrow groove | 3.5 mm | 2.0 mm |
| sipe (a depth is a depth from a groove bottom of a center narrow groove) | 0.6 mm | 12.1 mm |
| shoulder lateral groove | 11.2 mm | 23.6 mm |
| shoulder narrow groove | 2.8 mm | 7.7 mm |

Evaluation has been conducted as follows.

Wear-resistance properties: an amount of wear of the tread after travel of 20000 km was measured, and the result of measurement was indexed. The larger the index is, the lesser the wear occurs, and hence the more excellent the wear-resistance properties become.

Uneven-wear-resistance properties: an uneven-worn state of the tread after travel of 20000 km (an amount of heel-and-toe wear and a difference between an amount of wear of the center land portion and an amount of wear of the shoulder land portions) was measured, and the result of measurement was indexed. The larger the index is, the lesser the uneven wear occurs, and hence the more excellent the uneven-wear-resistance properties become.

Traction Properties: time required for the vehicle to travel 20 m from a stopped state on a road surface having a water depth of 1 mm in a state in which the land portions of the tread were worn by 70% was measured, and the result of measurement was indexed. The larger the index is, the lesser the required time becomes, and hence the more excellent the traction properties become.

The result of evaluation is as illustrated in Table 2. Numerical values shown in Table 2 are indexes described above, respectively. The tires in Example were confirmed to be excellent in wear-resistance properties, uneven-wear-resistance properties and traction properties compared with the tires in Comparative Example.

TABLE 2

|  |  | Comparative Example | Example |
|---|---|---|---|
| Charac-teristics | Presence of overlap between a first protruding portion and a second protruding portion of a center block in a tire circumference direction | Yes | Yes |
|  | Presence of the bending portion in a shoulder narrow groove | No | Yes |
| Result | Wear-resistance properties | 106 | 109 |
|  | Uneven-wear-resistance properties | 104 | 111 |
|  | Traction properties | 100 | 101 |

What is claimed is:

1. A pneumatic tire including a shoulder land portion between a main groove extending in a tire circumference direction and a tire ground contact end comprising:
   a plurality of first shoulder blocks arranged in the tire circumference direction on the main groove side in the shoulder land portion, and a plurality of second shoulder blocks arranged in the tire circumference direction on the tire ground contact end side in the shoulder land portion, and
   a lateral groove which segmentalizes the first shoulder blocks adjacent to each other and forms a recessed portion at a location inside of a tire width direction of the second shoulder block;
   wherein the first shoulder blocks and the second shoulder blocks are arranged alternately in the tire circumference direction,
   wherein the first shoulder blocks each include a protruding portion,
   wherein the protruding portion comprises a top area and two slope areas on both sides of the top area; and the entire top area of the protruding portion is formed in a space between two of the second shoulder blocks arranged in the tire circumference direction,
   wherein at least at the time of being grounded, the protruding portion of each of the first shoulder blocks overlaps in the tire circumference direction with the second shoulder blocks on both sides in the tire circumference direction and the first shoulder block overlaps in the tire width direction with the second shoulder blocks on both sides in the tire circumference direction, and
   first opposing portions extending linearly in the tire circumferential direction are formed on both sides of the protruding portion of the first shoulder block in the tire circumferential direction,
   the second shoulder block includes second opposing portions opposing the first opposing portions of the first shoulder block and extending linearly in the tire circumferential direction, and
   second slopes opposing the first slopes of the protruding portion of the first shoulder block and being at a slope of the same angle as the first slopes, and the second slopes are at ends of both sides of the second shoulder block in the tire circumferential direction;
wherein neither narrow groove nor sipe is provided to the first shoulder blocks and the second shoulder blocks.

2. The pneumatic tire according to claim 1, wherein a depth of the lateral groove between the first shoulder blocks adjacent to each other in the tire circumference direction and a depth of a lateral groove between the second shoulder blocks adjacent to each other in the tire circumference direction are not smaller than 70% of a depth of the main groove.

3. The pneumatic tire according to claim 1, wherein the two slope areas of the protruding portion of the first shoulder block includes a first slope extending at a slope with respect to the tire circumference direction, and the second shoulder block includes a second slope opposing the first slope, and at least at the time of being grounded, the first slope and the second slope overlap with each other in the tire circumference direction.

4. The pneumatic tire according to claim 1, wherein the plurality of first shoulder blocks have the same shape.

5. The pneumatic tire according to claim 1, wherein the plurality of second shoulder blocks have the same shape.

6. The pneumatic tire according to claim 1, wherein the plurality of first shoulder blocks have the same shape and the plurality of second shoulder blocks have the same shape and the shape of the plurality of first shoulder blocks differs from the shape of the plurality of second shoulder blocks.

\* \* \* \* \*